(12) United States Patent
Tidd

(10) Patent No.: US 8,863,232 B1
(45) Date of Patent: *Oct. 14, 2014

(54) SYSTEM FOR AND METHODS OF CONTROLLING USER ACCESS TO APPLICATIONS AND/OR PROGRAMS OF A COMPUTER

(75) Inventor: William Tidd, Alton Bay, NH (US)

(73) Assignee: hopTo Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,228

(22) Filed: Feb. 6, 2012

Related U.S. Application Data

(60) Provisional application No. 61/439,765, filed on Feb. 4, 2011.

(51) Int. Cl.
G06F 21/00 (2013.01)

(52) U.S. Cl.
USPC ............ 726/2; 726/3; 726/4; 726/15; 726/22; 713/151; 713/152

(58) Field of Classification Search
CPC ........................................................ G06F 17/30
USPC .......................... 726/2, 3, 4, 27; 713/151, 152
See application file for complete search history.

(56) References Cited

U.S. PATENT DOCUMENTS

| 5,898,419 | A | 4/1999 | Liu |
| 7,188,181 | B1 | 3/2007 | Squier et al. |
| 7,222,158 | B2 | 5/2007 | Wexelblat |
| 7,249,175 | B1 | 7/2007 | Donaldson |
| 7,526,792 | B2 * | 4/2009 | Ross ................................ 726/2 |
| 7,587,459 | B2 | 9/2009 | Wewalaarachchi et al. |
| 7,647,411 | B1 | 1/2010 | Schiavone et al. |
| 7,920,528 | B2 | 4/2011 | Karaoguz et al. |
| 8,073,855 | B2 | 12/2011 | Nagoya |
| 8,219,807 | B1 | 7/2012 | Danoyan et al. |
| 8,281,410 | B1 * | 10/2012 | Sobel et al. ...................... 726/27 |
| 8,427,445 | B2 | 4/2013 | Kennedy |
| 8,527,978 | B1 | 9/2013 | Sallam |
| 8,688,734 | B1 | 4/2014 | Tidd |

(Continued)

FOREIGN PATENT DOCUMENTS

WO    WO 2010/135127    11/2010

OTHER PUBLICATIONS

"Role-based access control on the web"; Park et al; ACM transactions on information and system security; vol. 4, No. 1, Feb. 2001.p. 37-71, 35 pages.*

(Continued)

Primary Examiner — Jason Lee
(74) Attorney, Agent, or Firm — Lewis Roca Rothgerber LLP

(57) ABSTRACT

A system includes an application access manager driver and an operating system (OS) kernel module in a kernel-mode address space of an OS. The system also includes application modules, a public application whitelist, a public application whitelist manager, a user/group application whitelist, and a user/group application whitelist manager in a user-mode address space of the OS. A method includes receiving a request to launch an application, calling a "create process" function in the OS kernel module, calling a pre-registered "create process" callback function to the application access manager driver, and determining whether the application is allowed to execute based on whether the application access manager driver identifies the application as an allowable process in either public application whitelist or user/group application whitelist.

20 Claims, 6 Drawing Sheets

(56) References Cited

U.S. PATENT DOCUMENTS

| | | |
|---|---|---|
| 8,713,658 B1 | 4/2014 | Tidd |
| 2002/0158921 A1 | 10/2002 | Silverstein |
| 2003/0163448 A1 | 8/2003 | Kilemba et al. |
| 2004/0080771 A1 | 4/2004 | Mihira et al. |
| 2004/0190049 A1 | 9/2004 | Itoh |
| 2005/0093868 A1 | 5/2005 | Hinckley |
| 2005/0114760 A1 | 5/2005 | Arregui et al. |
| 2005/0149857 A1 | 7/2005 | Negishi et al. |
| 2005/0177730 A1 | 8/2005 | Davenport et al. |
| 2005/0198299 A1 | 9/2005 | Beck et al. |
| 2006/0047780 A1 | 3/2006 | Patnude |
| 2006/0075224 A1 | 4/2006 | Tao |
| 2006/0150256 A1 | 7/2006 | Fanton et al. |
| 2006/0253558 A1 | 11/2006 | Acree et al. |
| 2007/0061264 A1 | 3/2007 | Yeung et al. |
| 2007/0078994 A1 | 4/2007 | Wilson et al. |
| 2007/0113187 A1 | 5/2007 | McMullen et al. |
| 2007/0283446 A1 | 12/2007 | Yami et al. |
| 2008/0071860 A1 | 3/2008 | Dal Canto et al. |
| 2008/0137131 A1 | 6/2008 | Cavill et al. |
| 2008/0209537 A1 | 8/2008 | Wong et al. |
| 2008/0270516 A1 | 10/2008 | Ragnet et al. |
| 2009/0021387 A1 | 1/2009 | Hosono |
| 2009/0024626 A1 | 1/2009 | Takei |
| 2009/0037976 A1 | 2/2009 | Teo et al. |
| 2009/0070404 A1 | 3/2009 | Mazzaferri |
| 2009/0083852 A1* | 3/2009 | Kuo et al. .................. 726/22 |
| 2009/0132509 A1 | 5/2009 | Nagoya |
| 2009/0180777 A1 | 7/2009 | Bernard et al. |
| 2009/0235347 A1 | 9/2009 | Syed et al. |
| 2009/0245176 A1 | 10/2009 | Balasubramanian et al. |
| 2009/0300129 A1 | 12/2009 | Golub |
| 2010/0058431 A1 | 3/2010 | McCorkendale et al. |
| 2010/0138780 A1 | 6/2010 | Marano et al. |
| 2010/0153581 A1 | 6/2010 | Nagarajan et al. |
| 2010/0293499 A1 | 11/2010 | Young et al. |
| 2010/0295817 A1 | 11/2010 | Nicholson et al. |
| 2010/0325716 A1 | 12/2010 | Hong et al. |
| 2011/0029772 A1 | 2/2011 | Fanton et al. |
| 2011/0137974 A1 | 6/2011 | Momchilov |
| 2011/0138295 A1 | 6/2011 | Momchilov et al. |
| 2011/0138314 A1 | 6/2011 | Mir et al. |
| 2011/0258271 A1 | 10/2011 | Gaquin |
| 2011/0279829 A1 | 11/2011 | Chang et al. |
| 2011/0314093 A1 | 12/2011 | Sheu et al. |
| 2012/0011578 A1 | 1/2012 | Hinton et al. |
| 2012/0023593 A1 | 1/2012 | Puder et al. |
| 2012/0084713 A1 | 4/2012 | Desai et al. |
| 2012/0159570 A1* | 6/2012 | Reierson et al. .................. 726/2 |
| 2012/0173673 A1 | 7/2012 | Dietrich et al. |
| 2012/0297471 A1 | 11/2012 | Smithson |
| 2012/0311070 A1 | 12/2012 | BianRosa et al. |
| 2012/0324365 A1 | 12/2012 | Momchilov et al. |
| 2013/0060842 A1 | 3/2013 | Grossman |
| 2013/0097550 A1 | 4/2013 | Grossman et al. |
| 2013/0198600 A1 | 8/2013 | Lockhart et al. |
| 2013/0318582 A1 | 11/2013 | McCann et al. |
| 2014/0012574 A1 | 1/2014 | Pasupalak et al. |
| 2014/0143846 A1 | 5/2014 | Tidd |
| 2014/0143847 A1 | 5/2014 | Tidd |

OTHER PUBLICATIONS

U.S. Appl. No. 13/481,746 Final Office Action mailed Mar. 26, 2014.
U.S. Appl. No. 13/570,108 Office Action mailed May 13, 2014.
U.S. Appl. No. 13/753,474 Final Office Action mailed Mar. 6, 2014.
U.S. Appl. No. 13/570,106 Office Action mailed Feb. 27, 2014.
U.S. Appl. No. 13/570,115 Office Action mailed Feb. 11, 2014.
U.S. Appl. No. 13/481,746 Office Action mailed Dec. 19, 2013.
U.S. Appl. No. 13/481,751 Office Action dated Dec. 30, 2013.
U.S. Appl. No. 13/367,239 Final Office Action dated Nov. 14, 2013.
U.S. Appl. No. 13/481,742 Final Office Action dated Sep. 4, 2013.
U.S. Appl. No. 13/481,752 Final Office Action dated Sep. 4, 2013.
U.S. Appl. No. 13/753,474 Office Action dated Nov. 21, 2013.
U.S. Appl. No. 13/367,239 Office Action dated Jun. 24, 2013.
U.S. Appl. No. 13/481,742 Office Action dated May 9, 2013.
U.S. Appl. No. 13/481,752 Office Action dated May 9, 2013.
U.S. Appl. No. 13/753,474 Office Action mailed Jun. 11, 2014.
U.S. Appl. No. 13/570,115 Final Office Action mailed Jun. 30, 2014.

* cited by examiner

SYSTEM FOR AND METHODS OF CONTROLLING USER ACCESS TO APPLICATIONS AND/OR PROGRAMS OF A COMPUTER

RELATED APPLICATIONS

This application claims priority to U.S. provisional patent 61/439,765, filed Feb. 4, 2011.

TECHNICAL FIELD

Various inventive embodiments disclosed herein relate generally to computer security applications. In particular, embodiments disclosed herein relate to a system for and methods of controlling user access to applications and/or programs of a computer.

BACKGROUND

In a shared computing environment, multiple users are accessing a common computer, such as a server, either directly or remotely via a network connection. Often in a shared computing environment most of the computer's files, programs, processes, and resources may be accessed or browsed by the users. However, certain files, programs, processes, and resources may be sensitive in nature and it may be desired to restrict users' access. Therefore, security measures are implemented on shared computers that attempt to provide isolation between users and thereby prevent one user from accessing another user's data and/or from performing any unauthorized actions. Currently, computer operating systems provide security features by which an administrator of a shared computer may configure each user (i.e., grant permissions or specify restrictions). However, there may be a great deal of complexity associated with using these security features. Therefore, the process of configuring the security settings of multiple users may be very difficult and time consuming.

BRIEF DESCRIPTION OF THE DRAWINGS

Various inventive embodiments disclosed herein, both as to its organization and manner of operation, together with further objectives and advantages, may be best understood by reference to the following description, taken in connection with the accompanying drawings as set forth below.

DETAILED DESCRIPTION

The disclosure provides a system with improved security features for controlling user access to applications and/or programs, and more particularly to limiting or restricting user access to applications and/or programs of a computer. The system of the invention exhibits numerous advantages over existing systems. In various embodiments, the system and associated methods may provide a simple process by which an administrator may specify a list of allowable applications and/or programs. Further, in some embodiments, the system of the invention may be configured such that a data structure of allowable applications and/or programs are more readily available to an operating system kernel module. The system and methods of the invention provide isolation between different users and sessions, such that one user accessing a shared computer cannot access other user's data and/or perform any unauthorized actions.

Figure 1:
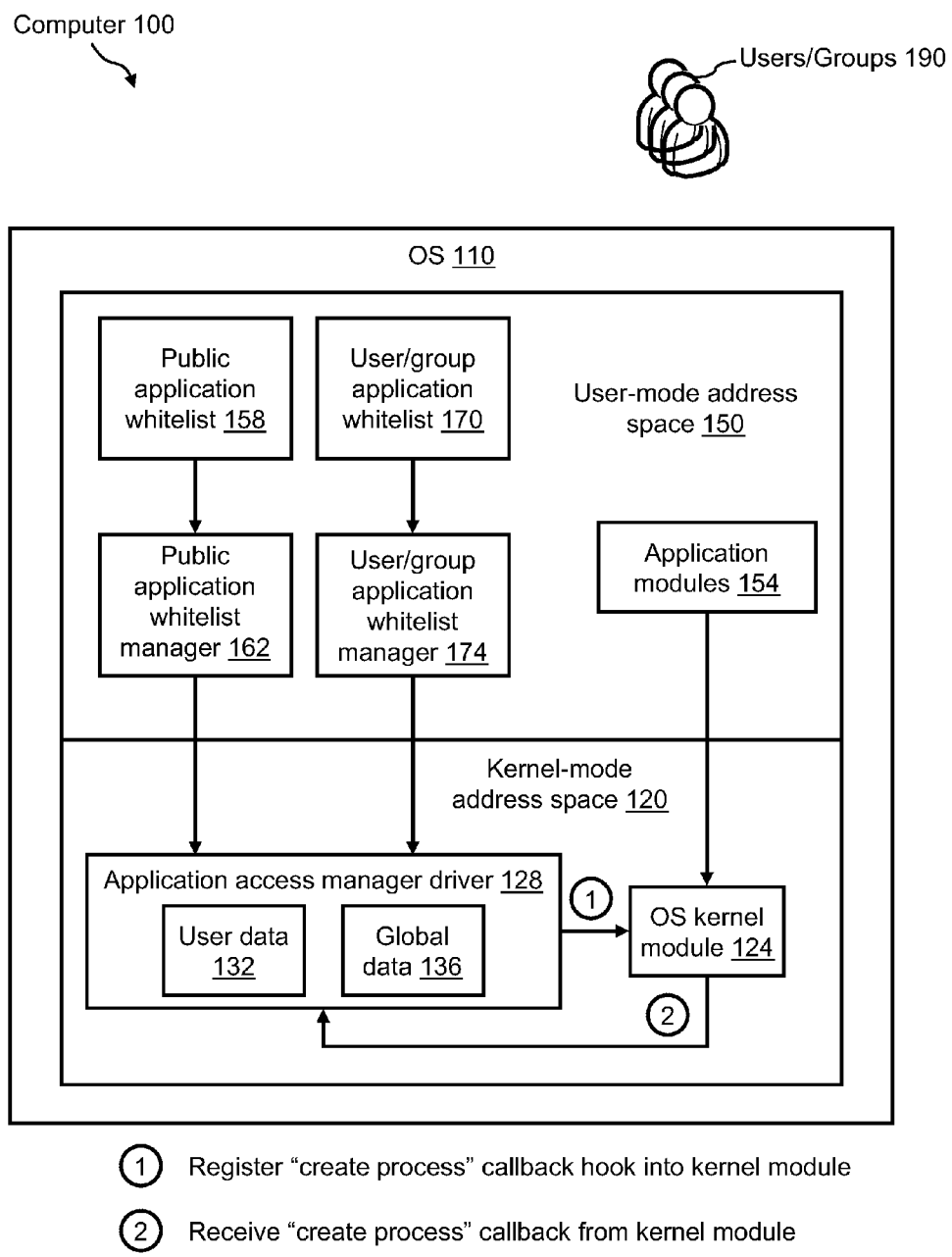
FIG. 1 illustrates a block diagram of a computer that includes security features for controlling user access to applications and/or programs, according to the present disclosure.

FIG. 1 illustrates a block diagram of a computer 100 that includes security features for controlling user access to applications and/or programs, and more particularly to limiting or restricting user access to applications and/or programs of computer 100. Computer 100 includes an operating system (OS) 110 such as Windows® (Microsoft Corporation, Redmond, Wash., USA) or Linux. OS 110 segregates virtual memory into a kernel-mode address space 120 (i.e., kernel space) and a user-mode address space 150 (i.e., user space). In general terms, kernel space is reserved for running an OS kernel, kernel extensions, and most device drivers. In contrast, user space is the memory area in which user mode applications operate.

Although not explicitly shown in FIG. 1, those skilled in the art will recognize that computer 100 includes other components, such as input/output devices (e.g., mouse, keyboard, display, touch screen), primary and/or secondary storage medium or memory, a central processing unit (CPU), a communications bus, a network connection, and the like. Additionally, computer 100 may be accessed by one or more users/groups 190. In one example, computer 100 may be a host computer or centralized server that users/groups 190 may access remotely via a network (not shown). In other example, computer 100 may be a shared public computer that is accessed directly by one or more users/groups 190. In yet another example, computer 100 may be accessed either directly or via a remote connection. In any case, users/groups 190 may be granted access to computer 100 using a login and authentication process.

An operating system (OS) kernel module 124 and an application access manager driver 128 are loaded into kernel-mode address space 120. In embodiments in which OS 110 of computer 100 is the Microsoft Windows OS, OS kernel module 124 may be NTOSKRNL.EXE. Application access manager driver 128 may be implemented in the form of a kernel dynamic link library (DLL) or driver. OS kernel module 124 communicates with application access manager driver 128 using software calls referred to as callbacks, as will be further described herein.

This disclosure may relate to application publishing. The functionality of a server application shall be visible to and accessible by a client via a network. For example, server application may be a computer-aided design (CAD) application, such as AutoCAD (Autodesk, Inc., San Rafael, Calif., USA) or Cadence Virtuoso (Cadence Design Systems, San Jose, Calif.); a medical clinical workflow application such as Symbia.net (Siemens AG, Munich, Germany); an interactive mapping application such as Google Earth (Google, Inc.) or a 3D game. The functionality of the server application shall be visible to and accessible by the client via a network. For example, the functionality of a server application may be accessed from a client using a process herein known as application publishing, which is currently supported by products such as GraphOn GO-Global, Microsoft Remote Desktop Services and Citrix XenApp. Such application publishing may be performed in accordance with teachings of commonly-owned U.S. Pat. No. 5,831,609, filed Jun. 6, 1995, entitled "Method and system for dynamic translation between different graphical user interface systems," which is incorporated by reference as though fully set forth herein.

User-mode address space 150 includes any number of application modules 154, a public application whitelist 158, an public application whitelist manager 162, a user/group application whitelist 170, and a user/group application whitelist manager 174. User/group application whitelist 170 and public application whitelist 158 are maintained in any data storage medium (not shown) of computer 100. The communication path between application modules 154 and OS kernel module 124 signifies that each application module is capable of passing information (e.g., the path to an application module) to OS kernel module 124 during operation. The communication paths from user/group application whitelist 170 to user/group application whitelist manager 174 and from public application whitelist 158 to public application whitelist manager 162 signify that both whitelists can be read from storage and information therein can be provided to application access manager driver 128 during operation.

When a process (parent process) running on computer 100 attempts to start another process (child process) while executing code in an application module 154, a request is sent to kernel address space 120, and more particularly to OS kernel module 124. For example, on Windows computers, when a user double-clicks a Microsoft Word icon on the desktop, the process running the Windows Desktop executable module (i.e., EXPLORER.EXE) executes a number of functions that eventually send a command to the OS kernel module 124 to start a new process running the Microsoft Word executable module (WINWORD.EXE). In this example, the process running EXPLORER.EXE is the parent process and the new process running WINWORD.EXE is the child process. By way of useful background, Windows Explorer is a Windows GUI shell that lets a user examine hard drives, folders, and files of computer 100.

When application access manager driver 128 receives notification of a request to run an application or process. Application access manager driver 128 processes the request and either allows the process to run or denies the request. That is, as access to a certain application is requested, application access manager driver 128 performs an application filtering function according to the invention. In this way, application access manager driver 128 is used to enforce access restrictions on the applications of computer 100.

Public application whitelist 158 is a resource (e.g., a file or files) for storing a list of applications that may be run by all users/groups 190 on computer 100. Such a resource is referred to in the art as a centralized whitelist. The contents of public application whitelist 158 are set up by an administrator.

Public application whitelist manager 162 starts when computer 100 boots up. Public application whitelist manager 162 is responsible for communicating public application whitelist 158 to application access manager driver 128 to be stored in global data 136 at application access manager driver 128, which can be accessed from any process. Public application whitelist manager 162 reads public application whitelist 158 from storage, adds to the whitelist any applications that an administrator has published to all users/groups 190, and then sends the whitelist to application access manager driver 128. As such, the act of publishing an application automatically grants all users/groups 190 rights to that application. Public application whitelist manager 162 sends public application whitelist 158 to application access manager driver 128 directly via a method that allows user-mode modules to send messages to kernel mode modules (drivers). On Windows computers this may be done using an IO Control.

User/group application whitelist 170 is a resource (e.g., a file or files) for storing a list of programs that are allowed to run on computer 100 by a specific user or group 190. User/group application whitelist 170 may include an association between programs and users or groups. It is further expressly contemplated that user/group application whitelist 170 may instead be a blacklist; that is, a resource storing only those programs that are not allowed to be run by each user or group 190. The contents of user/group application whitelist 170 are set up by an administrator. The administrator may make manual entries to user/group application whitelist 170 and/or automatically enable a user access to programs that an administrator has published to a user or group (e.g., programs that are referenced by shortcuts included in the user's profile.

User/group application whitelist manager 174 may be the program that manages initialization of the user's environment. User/group application whitelist manager 174 loads user/group application whitelist 170 from storage, adds to the whitelist programs that are published to the user (or groups to which the user belongs), and sends user/group application whitelist 170 to application access manager driver 128 to be stored in user data 132. Public application whitelist 158 can be edited by public application whitelist manager 162 or by the logon process at user/group application whitelist manager 174. By contrast, the user/group application whitelist 170 can only be edited by the logon process at user/group application whitelist manager 174. For the purposes of the invention, public application whitelist manager 162 and user/group application whitelist manager 174 may be implemented as separate processes or as a single process.

Figure 2:
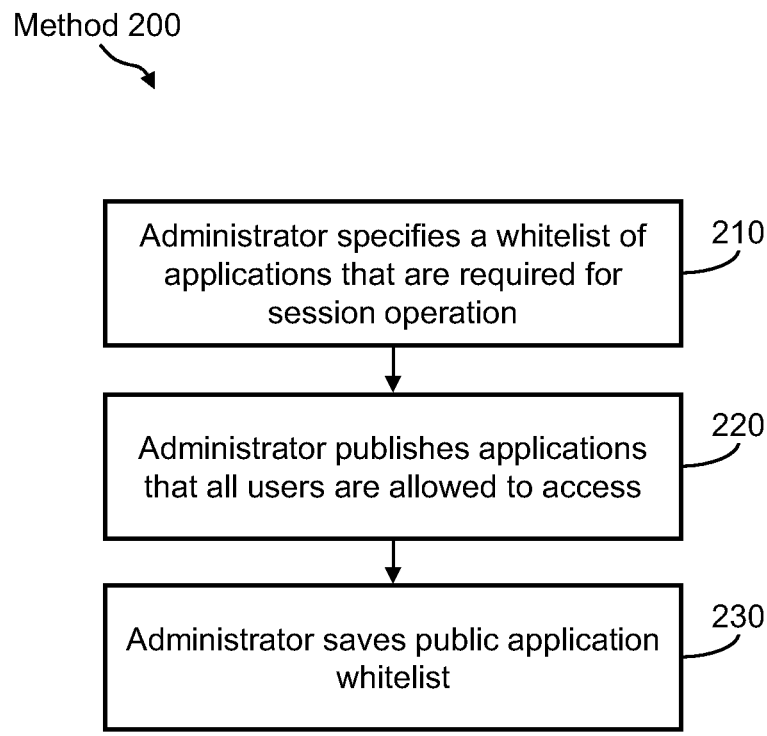
FIG. 2 illustrates a flow diagram of a method of defining public access to computer applications and/or programs, according to the present disclosure.

FIG. 2 illustrates a flow diagram of a method 200 of defining public access to applications and/or programs of computer 100, and more particularly of defining public application whitelist 158. Method 200 may include, but is not limited to, the following steps.

At step 210, an administrator (or other user with similar rights) uses an input device (not shown) of computer 100 to enter information regarding applications and/or programs that are required for users/groups 190 to access computer 100 and run the programs that are published to the user. On Windows computers, an example of one such program is ctfmon.exe, a Windows program that manages keyboard layouts.

At step 220, the administrator uses an input device (not shown) of computer 100 to enter information regarding applications and/or programs that may be invoked by all users/groups 190 of computer 100. That is, in the process of configuring computer 100, the administrator publishes a set of applications to all users/groups 190. For example, an administrator may publish Microsoft Word® by creating a shortcut to Microsoft Word® in the Public\Desktop folder of computer 100. The act of publishing an application to all users/groups 190 automatically grants all users/groups 190 rights to that application, as described in step 450 of method 400 of FIG. 4.

Step 220 provides a benefit over conventional systems in which there is no connection between the process of publishing applications to a user and restricting the user from running applications that are not published. For example, administrators can publish applications to users on Windows computers using Group Policy Preferences and grant/deny users access to applications using Group Policy. With these methods, however, administrators must publish the applications and then separately perform manual steps to grant the user the right to run the published applications and restrict the user from running applications that are not published. In step 220, administrators must only publish the applications; the system then automatically grants the user access to the published applications and denies the user access to all other applications that are not in public application whitelist 158.

At step 230, the administrator saves the set of processes defined at step 210 in the form of public application whitelist 158 to storage medium (not shown) of computer 100. Optionally, the administrator may also save the list of published applications defined at step 220 in public application whitelist 158 to storage medium of computer 100, but in order to avoid data duplication, published applications are typically added to public application whitelist 158 at step 450 of method 400 of FIG. 4. In one example, public application whitelist 158 is stored as an XML file in a default system directory to which all users are granted read access but only administrators are granted write access.

Figure 3:
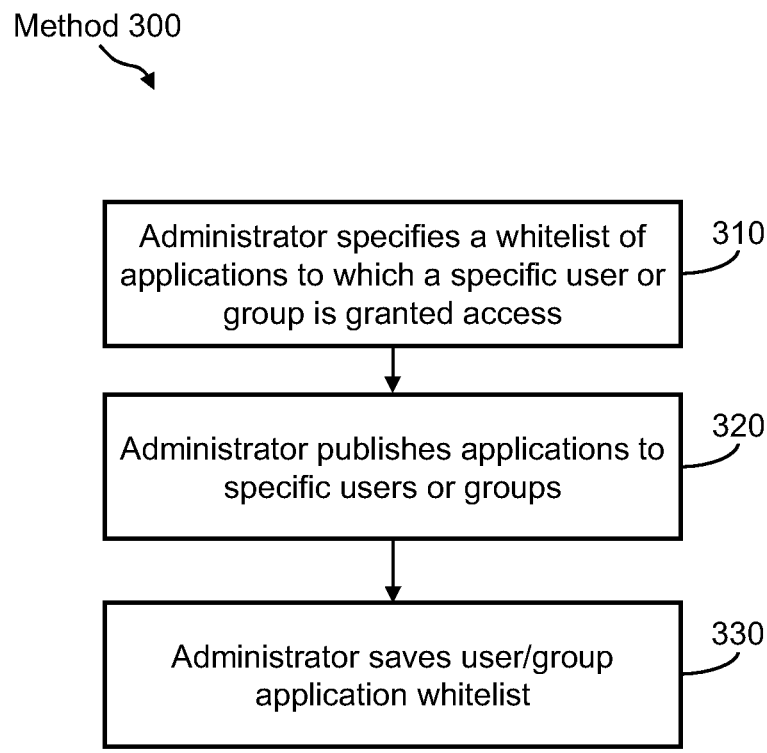
FIG. 3 illustrates a flow diagram of a method of defining user-specific and group-specific access to computer programs, according to the present disclosure.

FIG. 3 illustrates a flow diagram of a method 300 of defining user-specific and group-specific access to programs of computer 100, and more particularly of defining user/group application whitelist 170. Method 300 may include, but is not limited to, the following steps.

At step 310, an administrator (or other user with similar rights) uses an input device (not shown) of computer 100 to enter information regarding the programs of computer 100 that specific users or groups are allowed to run. In one example, the administrator generates a user-specific or group-specific whitelist for each user or group 190. In another example, the administrator generates one whitelist in which each program entry includes a list of the users and groups 190 that are allowed to access the program.

At step 320, which may be in addition to or in place of step 310, the administrator publishes applications to specific users or groups 190. For example, on a Windows computer, an administrator may publish Microsoft Word® to a specific group of users using Group Policy Preferences. Like step 220 of method 200 of FIG. 2, the act of publishing the application automatically grants specific users 190 and/or specific groups 190 rights to that application. As such, step 320 provides a benefit over conventional systems in which there is no connection between the process of publishing applications to a user or group and automatically granting the user of group rights to run the applications. This process is managed by user/group application whitelist manager 174 at step 530 of method 500 of FIG. 5. Again, current methods use group policy to enforce process restrictions, in which an administrator must publish the applications and then separately perform manual steps to grant the user rights to certain applications and/or to restrict the user from running applications.

In one example, the administrator specifies an application path and executable name for each allowable program. In another example, a directory can be specified and all programs within the directory (and, if present, subdirectories of the directory) can be considered allowable programs. In yet another example, the administrator can specify that a hash code be generated and used to identify each allowable program. Hash codes may be derived using any conventional or novel hashing process known to one of skill.

At step 330, the administrator saves the allowable processes in the form of user/group application whitelist 170 to storage medium (not shown) of computer 100. In one example, each user/group application whitelist 170 is stored in an XML file in a user-specific or group-specific directory. Further, this file or directory can have read-only access properties for users or groups 190. The properties are enforced by OS 110 and prevent unauthorized modifications of user allowable processes.

Figure 4:
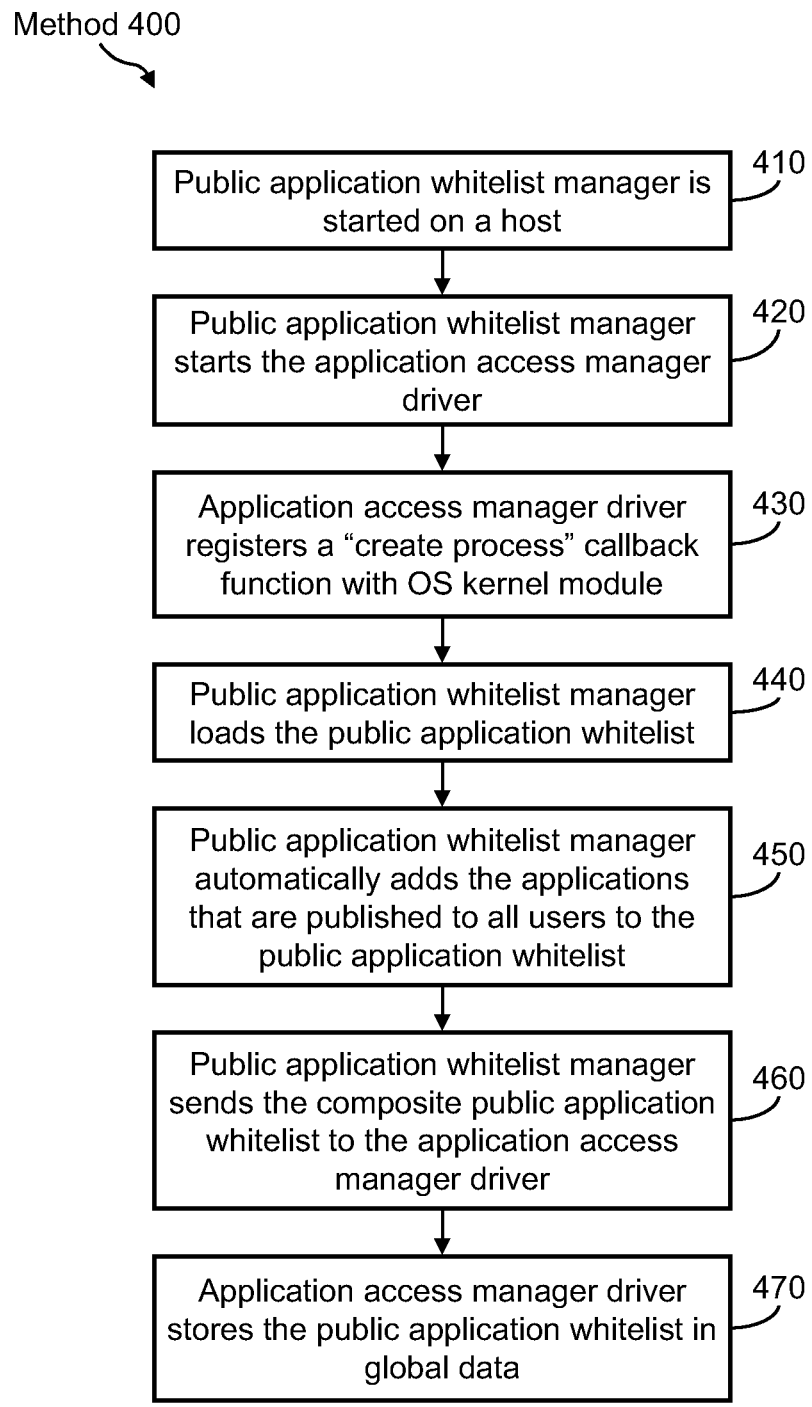
FIG. 4 illustrates a flow diagram of a method of initializing public access to computer programs, according to the present disclosure.

FIG. 4 illustrates a flow diagram of a method 400 of initializing public access to programs of computer 100, and more particularly of passing public application whitelist 158 to application access manager driver 128. Method 400 may include, but is not limited to, the following steps.

At step 410, public application whitelist manager 162 is started on computer 100. In one example, public application whitelist manager 162 is started during the startup process of OS 110. Note that startup typically occurs prior to user authentication.

At step 420, public application whitelist manager 162 loads and initializes application access manager driver 128 if application access manager driver 128 is not already running (e.g., if application access manager driver 128 is not configured to load when OS 110 boots).

At step 430, application access manager driver 128 registers a "create process" callback function with OS kernel module 124. This involves passing a reference to a function of application access manager driver 128 to kernel module 124 that meets OS 110's requirements for "create process" callback functions. These requirements may include calling convention and parameter requirements.

At step 440, public application whitelist manager 162 loads public application whitelist 158 from storage medium (not shown) into primary memory (not shown) of computer 100.

At step 450, based on applications that are published in step 220 of method 200 of FIG. 2, public application whitelist manager 162 automatically adds the applications that are published to all users to the contents of public application whitelist 158. For example, on Windows computers, the list of published applications may be obtained by searching directories within the user's user profile for shortcuts to applications.

At step 460, public application whitelist manager 162 transmits the composite public application whitelist 158 to application access manager driver 128. In so doing, the list of public allowable programs crosses over from user-mode address space 150 to kernel-mode address space 120.

At step 470, application access manager driver 128 stores public application whitelist 158 in global data 136 of application access manager driver 128.

The benefits of performing method 400 of FIG. 4 include (1) bringing public application whitelist 158 into kernel space, where it may be accessed with high efficiency during user-specific program access enforcement methods and (2) creating a communication path from OS kernel module 124 to application access manager driver 128 that can be used to enforce the program restrictions defined in public application whitelist 158.

Figure 5:
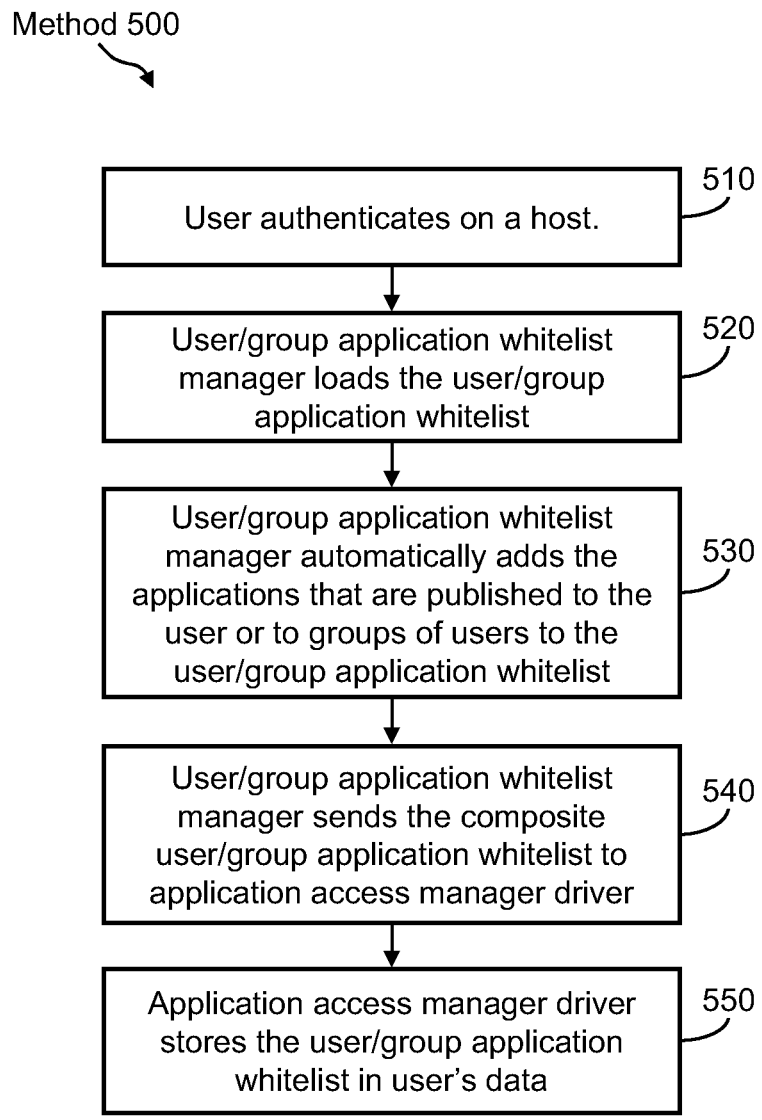
FIG. 5 illustrates a flow diagram of a method of initializing user-specific and group-specific access to computer programs, according to the present disclosure.

FIG. 5 illustrates a flow diagram of a method 500 of initializing user-specific and group-specific access to programs of computer 100, and more particularly of passing user/group application whitelist 170 to application access manager driver 128. Method 500 may include, but is not limited to, the following steps.

At step 510, a certain user 190 is authenticated with computer 100. This step may include a username and password check or other type of conventional or novel authentication known to one of skill. This step generally assumes that the list of allowable users has been predetermined for computer 100 and is accessible from storage.

At step 520, user/group application whitelist manager 174 reads into memory (not shown) of computer 100 the list of allowable programs contained in user/group application whitelist 170 that are associated with the authenticated user 190 and any groups of which the user belongs. The allowable programs may be read from a file into a data structure that can be quickly searched, such as an array list.

At step 530, based on applications that are published in step 310 of method 300 of FIG. 3, user/group application whitelist manager 174 automatically adds any applications that are published to the authenticated user 190 to the contents of user/group application whitelist 170. This also includes automatically adding applications that are published to any groups of which the authenticated user 190 is a member. For example, on Windows computers, the list of published applications may be obtained by searching directories within the user's user profile for shortcuts to applications.

At step 540, user/group application whitelist manager 174 transmits the composite user/group application whitelist 170, which contains the user-specific list of allowable programs, to application access manager driver 128. Thus, the user/group list of allowable programs exists in kernel-mode address space 120.

At step 550, application access manager driver 128 stores user/group application access whitelist 170 in user data 132 of the authenticated user 190. User data 132 resides at application access manager driver 128.

The benefits of initialization method 500 include bringing user/group application whitelist 170 into kernel-mode address space 120, where it can be accessed with high efficiency during user-specific application access enforcement methods.

Figure 6:
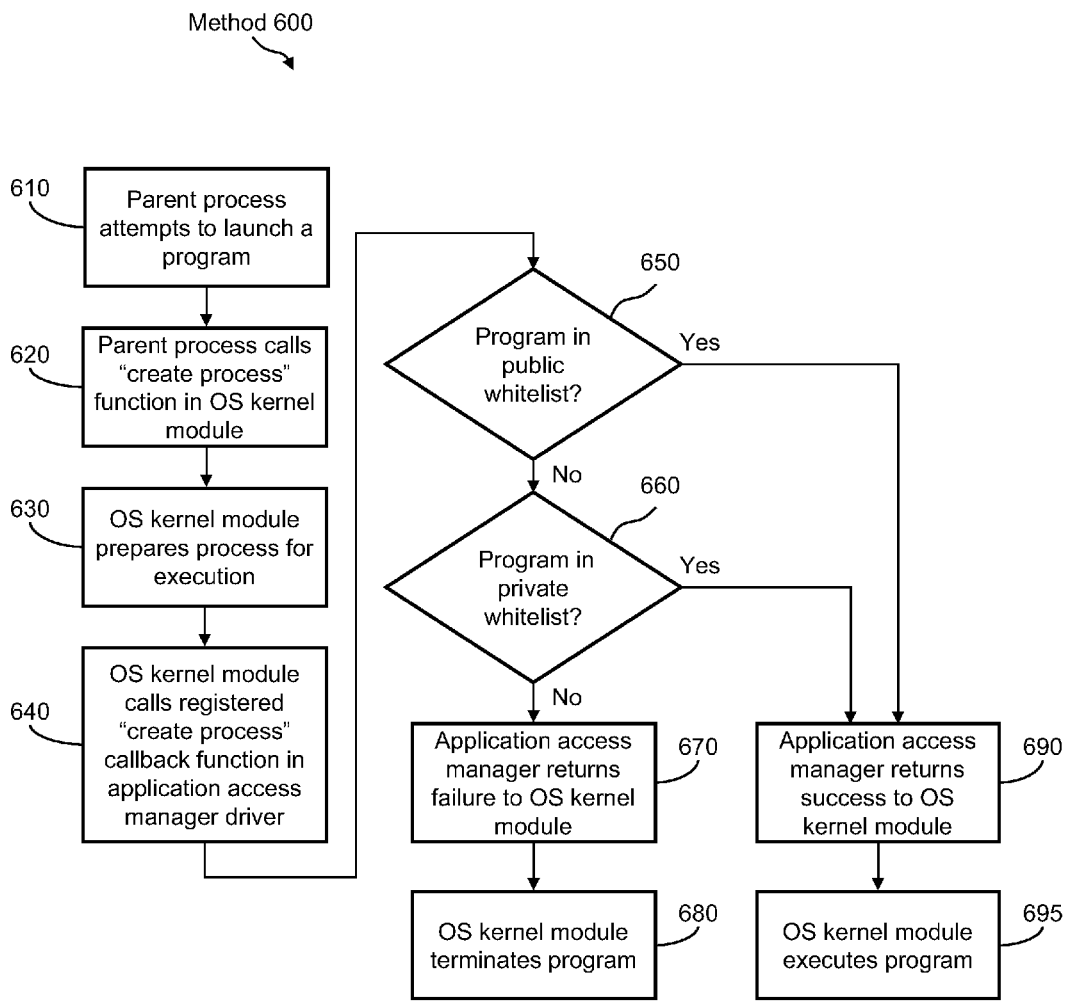
FIG. 6 illustrates a flow diagram of a method of enforcing access restrictions to computer applications and/or programs, according to the present disclosure.

FIG. 6 illustrates a flow diagram of a method 600 of enforcing access restrictions to applications and/or programs of computer 100. More particularly, method 600 is an example of a method of controlling user access to applications and/or programs of a computer. Method 600 may include, but is not limited to, the following steps.

At step 610, any process (parent process) executing application modules 154 attempts to launch a program of computer 100 and thereby create a child process. For example, the child process may be executing a word processing program such as Microsoft Word®, which is WINWORD.EXE, and the parent process of Microsoft Word® may be Windows Explorer, which is EXPLORER.EXE.

At step 620, parent process executing a specific application module 154 calls a "create process" function of OS kernel module 124. The "create process" function requests that OS kernel module 124 create a process and execute a specific application module 154.

At step 630, OS kernel module 124 prepares the process for execution. For example, OS kernel module 124 may set up an address space for the process, load the file containing the specific application module 154's code into memory, and/or set up a stack for the process.

At step 640, before starting the process, OS kernel module 124 calls application access manager driver 128's "create process" callback function, which was registered with OS kernel module 124 at step 430 of method 400 of FIG. 4.

At decision step 650, application access manager driver 128 determines whether the invoked program is present in public application whitelist 158. For example, application access manager driver 128 interrogates the contents of public application whitelist 158 for the requested program. If the program is present, method 600 proceeds to step 690. If the program is not present, method 600 proceeds to decision step 660.

At decision step 660, application access manager driver 128 determines whether the invoked program is present in user/group application whitelist 170. For example, application access manager driver 128 interrogates the contents of user/group application whitelist 170 for the requested program. If the program is present, method 600 proceeds to step 690. If the program is not present, method 600 proceeds to step 670.

According to one embodiment, public application whitelist 158 and user/group application whitelist 170 are both stored in kernel space memory. Decision steps 650 and 660 may include iterating through entries in both whitelists and, for each allowable process entry, checking as to whether the application matches the entry. In embodiments in which the list of allowable processes is stored in any one of a plurality of formats (e.g., a file name, a directory name, a hash), checking may include a format-specific step, such as comparing file name strings, iterating through a directory and comparing file name strings found therein, and/or calculating a file hash. The iteration may return a Boolean true if the allowable process is found, otherwise returning false.

At step 670, having determined that the invoked program is not present in any whitelist, application access manager driver 128 returns a failure indication to OS kernel module 124.

At step 680, OS kernel module 124 terminates the invoked program, which may include unloading any executable modules of application modules 154 that were prepared at step 630.

At step 690, having determined that the invoked program is in either the public application whitelist 158 or user/group application whitelist 170, application access manager driver 128 returns a success indication to OS kernel module 124.

At step 695, OS kernel module 124 starts the program, which may include starting an initial thread of the process that was prepared at step 630.

I claim:

1. A method for controlling user access to applications, comprising:
   receiving an user/group application whitelist, wherein the received user/group application whitelist is stored in a data storage medium and comprises applications associated with a specified group of one or more users;
   publishing one or more applications to the specified group of one or more users that is associated with the stored user/group application whitelist;
   authenticating that a user is a member of the specified group of one or more users to whom the applications are published; and
   automatically adding the applications that are published to the group of which the authenticated user is a member to the stored user/group application whitelist, wherein the stored user/group application whitelist is updated with the automatically added applications.

2. The method of claim 1, further comprising storing the user/group application whitelist in a user data of the authenticated user.

3. The method of claim 1, further comprising storing a public application whitelist in a data storage medium and automatically denying access to the applications in the user/group application whitelist that are not in the public application whitelist.

4. The method of claim 1, wherein the specified group is associated with a blacklist comprising one or more applications that are not allowed to be accessed by members of the specified group.

5. The method of claim 1, further comprising bringing the user/group application whitelist into a kernel-mode address space.

6. The method of claim 1, further comprising reading the stored user/group application whitelist into a searchable data structure.

7. The method of claim 6, wherein the searchable data structure comprises an array list.

8. An apparatus for controlling user access to applications, comprising:
- a communication network for receiving an user/group application whitelist comprising applications associated with a specified group of one or more users;
- a data storage medium for storing the received user/group application whitelist;
- a processor for executing instructions stored in memory, wherein execution of the instructions by the processor:
  - publishes one or more applications to the specified group of one or more users that is associated with the user/group application whitelist;
  - authenticates that a user is a member of the specified group of one or more users to whom the applications are published; and
  - automatically adds the applications that are published to the group of which the authenticated user is a member to the user/group application whitelist, wherein the user/group application whitelist is updated with the automatically added applications.

9. The apparatus of claim 8, wherein the data storage medium further stores a user data of the authenticated user and wherein the user/group application whitelist is stored in association with the user data of the authenticated user.

10. The apparatus of claim 8, wherein the data storage medium further stores a public application whitelist, and wherein the operating system automatically denies access to one or more of the applications in the user/group application whitelist that are not in the public application whitelist.

11. The apparatus of claim 8, wherein the data storage medium further stores a blacklist associated with the specified group, the blacklist comprising one or more applications that are not allowed to be accessed by members of the specified group.

12. The apparatus of claim 8, wherein the user/group application whitelist is in a kernel-mode address space in the data storage medium.

13. The apparatus of claim 8, wherein the user/group application whitelist is read into a searchable data structure in the data storage medium.

14. The apparatus of claim 13, wherein the searchable data structure comprises an array list in the data storage medium.

15. A non-transitory computer-readable storage medium having embodied thereon a program executable by a processor to perform a method for controlling user access to applications, the method comprising:
- receiving an user/group application whitelist, wherein the received user/group application whitelist comprises applications associated with a specified group of one or more users;
- publishing one or more applications to the specified group of one or more users that is associated with the stored user/group application whitelist;
- authenticating that a user is a member of the specified group of one or more users to whom the applications are published; and
- automatically adding the applications that are published to the group of which the authenticated user is a member to the stored user/group application whitelist, wherein the stored user/group application whitelist is updated with the automatically added applications.

16. The non-transitory computer-readable storage medium of claim 15, further comprising storing the stored user/group application whitelist in a user data of the authenticated user.

17. The non-transitory computer-readable storage medium of claim 15, further comprising storing a public application whitelist in a data storage medium and automatically denying access to the applications in the user/group application whitelist that are not in the public application whitelist.

18. The non-transitory computer-readable storage medium of claim 15, wherein the specified group is further associated with a blacklist comprising applications that are not allowed to be accessed by members of the specified group.

19. The non-transitory computer-readable storage medium of claim 15, further comprising bringing the stored user/group application whitelist into kernel-mode address space.

20. The non-transitory computer-readable storage medium of claim 15, further comprising reading the stored user/group application whitelist into a searchable data structure.

\* \* \* \* \*